United States Patent [19]

Nakatsuyama et al.

[11] Patent Number: 5,546,143
[45] Date of Patent: Aug. 13, 1996

[54] RECORDING DEVICE AND PROJECTING DEVICE FOR MOTION PICTURE FILM

[75] Inventors: Takashi Nakatsuyama, Chiba; Takahiko Saito, Kanagawa, both of Japan

[73] Assignee: Sony Corporation, Tokyo, Japan

[21] Appl. No.: 260,267

[22] Filed: Jun. 14, 1994

[30] Foreign Application Priority Data

Jun. 21, 1993 [JP] Japan .................. 5-149596

[51] Int. Cl.⁶ .................. G03B 1/00; G03B 21/48
[52] U.S. Cl. .................. 352/184; 352/166; 352/182; 352/29
[58] Field of Search .................. 352/166, 180, 352/182, 184, 29, 187

[56] References Cited

U.S. PATENT DOCUMENTS

| | | | |
|---|---|---|---|
| 2,953,965 | 9/1960 | Stiffler . | |
| 3,224,830 | 12/1965 | Mitchell . | |
| 3,843,073 | 10/1974 | Day | 242/204 |
| 3,853,394 | 12/1974 | Chamberlin | 352/184 |
| 3,942,882 | 3/1976 | Saito | 352/14 |
| 3,963,331 | 6/1976 | Komine et al. | 352/29 |
| 4,305,645 | 12/1981 | Okajima | 352/27 |
| 4,777,513 | 10/1988 | Nelson | 355/27 |
| 5,049,908 | 9/1991 | Murakami . | |
| 5,345,286 | 9/1994 | Stiehler | 354/173.1 |

*Primary Examiner*—Michael L. Gellner
*Assistant Examiner*—Daniel Chapik
*Attorney, Agent, or Firm*—William S. Frommer; Alvin Sinderbrand

[57] ABSTRACT

A device for recording a motion picture film and a device for projecting a motion picture film susceptible to generation of low noise due to film feed are provided. A motion picture film 10 is fed on the frame basis so that the film is fed as it is clamped between an idler 45 and a rotary drum 48 and so that the film feed is stopped as a voice coil 43 is driven for displacing the idler 45 away from the rotary drum 48. A recording unit 30 records a frame image of the motion picture film each time the film feed is halted. Recording may be made in this manner under the state of extremely low noise level due to film feed. Film feed is made in a similar manner during projection of each frame image, and each frame image is also projected by a projection unit 70 each time the film feed is halted. Projection may also be made in this manner under the state of extremely low noise level due to film feed.

6 Claims, 7 Drawing Sheets

RECORDING DEVICE AND PROJECTING DEVICE FOR MOTION PICTURE FILM

FIELD OF THE INVENTION

This invention relates to a recording device and a projecting device for a motion picture film. More particularly, it relates to recording and projecting devices for a motion picture film in which the motion picture film is transported under the force of friction.

PRIOR ART

Up to now, a 16 mm or 35 mm film having perforations on both longitudinal sides has been in extensive use as a motion picture film. With a motion picture film recording projecting devices, the motion picture film is intermittently fed at a rate of 24 frames per second, by sprockets engaging with the perforations, for recording or projecting picture frames.

On the other hand, a 35 mm film (system 135) is in extensive use as a photographic film. The 35 mm film has its size and characteristics of the photosensitive material prescribed by JIS and ISO.

Referring to FIG. 1, the 35 mm film 1 has a width, a distance between the perforations for film feed along the film width and a pitch of perforations 2 equal to 35 mm, 25 mm and 4.75 mm, respectively. With the 35 mm film 1, each frame 3 is rectangular in shape and has a dimension along the film width and a dimension along the film length of 24 mm and 36 mm, respectively. The frame 3 has a pitch equal to 38 mm which is eight times of that of the perforations 2.

The 35 mm film having the perforations on its both sides has the width of 35 mm, yet has an effective imaging area, that is the frame 3, having a dimension along the film width equal only to 24 mm. Thus a 35 mm film having perforations only on its one longitudinal side has been proposed in the U.S. Pat. No. 5,049,908, in which the perforations in the form of small holes are formed on one longitudinal side thereof in order to procure a dimension along the film width of 30 mm and thereby to increase the effective imaging area for improving the picture quality.

The conventional motion picture film recording and projecting device suffers from the objectionable mechanical noise, because the film is fed on the frame basis by the sprockets engaging in the perforations.

OBJECTS AND SUMMARY OF THE INVENTION

In view of the above-mentioned objects of the present invention, it is an object of the present invention to provide a motion picture film recording device and a motion picture film projecting device which is susceptible to generation of mechanical noise due to frame-based film feed to a lesser extent.

It is another object of the present invention to provide a motion picture film recording device and a motion picture projecting device employing a single side perforated 35 mm motion picture film as proposed in the U.S. Pat. No. 5,049,908.

It is yet another object of the present invention to provide a motion picture film recording device and a motion picture film projecting device in which frame-based film feed is performed under the force of friction instead of by the sprockets engaging in the film perforations.

The present invention provides a recording device for a motion picture film in which the force of friction of film feed means transporting the motion picture film under the force of friction is intermittently controlled by feed control means, and in which each frame image of the motion picture film is recorded by recording means each time the film feed by the film feed means is halted.

The recording device for a motion picture film according to the present invention comprises film feed means for transporting the motion picture film under the force of friction, feed control means for intermittently controlling the force of friction of the film feed means, and recording means for recording each frame image of the motion picture film each time the film feed by the film feed means is halted.

With the motion picture film recording device according to the present invention, the feed control means detects small openings provided at an equal interval in the motion picture film and reduces the force of friction of the film feed means at a pre-set interval.

With the motion picture film recording device according to the present invention, the feed control means effects control of reducing the force of friction of the film feed means at a pre-set time interval.

With the motion picture film recording device according to the present invention, the film feed means is made up of a first friction wheel rotated at a pre-set speed and a second friction wheel which may be moved into and out of contact with the first friction wheel. Film feed is made as the motion picture film is clamped between the first and second friction wheels, and film feed is halted as the second friction wheel is moved away from the first friction wheel.

By intermittently controlling the force of friction of film feed means transporting the motion picture film under the force of friction by feed control means, and by recording each frame image of the motion picture film each time the film feed by the film feed means is halted, recording may be achieved under the state of an extremely low noise level as compared to the case wherein the film feed is made by the sprockets.

The present invention provides a projecting device for a motion picture film in which the force of friction of film feed means transporting the motion picture film under the force of friction is intermittently controlled by feed control means, and in which each frame image of the motion picture film is projected by projecting means each time the film feed by the film feed means is halted.

The projecting device for a motion picture film according to the present invention comprises film feed means for transporting the motion picture film under the force of friction, feed control means for intermittently controlling the force of friction of the film feed means, and projecting means for projecting each frame image of the motion picture film each time the film feed by the film feed means is halted.

With the motion picture film projecting device according to the present invention, the feed control means detects small openings provided at an equal interval in the motion picture film and reduces the force of friction of the film feed means at a pre-set interval.

With the motion picture film projecting device according to the present invention, the feed control means effects control of reducing the force of friction of the film feed means at a pre-set time interval.

With the motion picture film projecting device according to the present invention, the film feed means is made up of a first friction wheel rotated at a pre-set speed and a second friction wheel which may be moved into and out of contact with the first friction wheel. Film feed is made as the motion picture film is clamped between the first and second friction wheels, and film feed is halted as the second friction wheel is moved away from the first friction wheel.

By intermittently controlling the force of friction of film feed means transporting the motion picture film under the force of friction by feed control means, and by projecting each frame image of the motion picture film each time the film feed by the film feed means is halted, projection may be achieved under the state of an extremely low noise level as compared to the case wherein the film feed is made by the sprockets.

EMBODIMENTS

Figure 1:
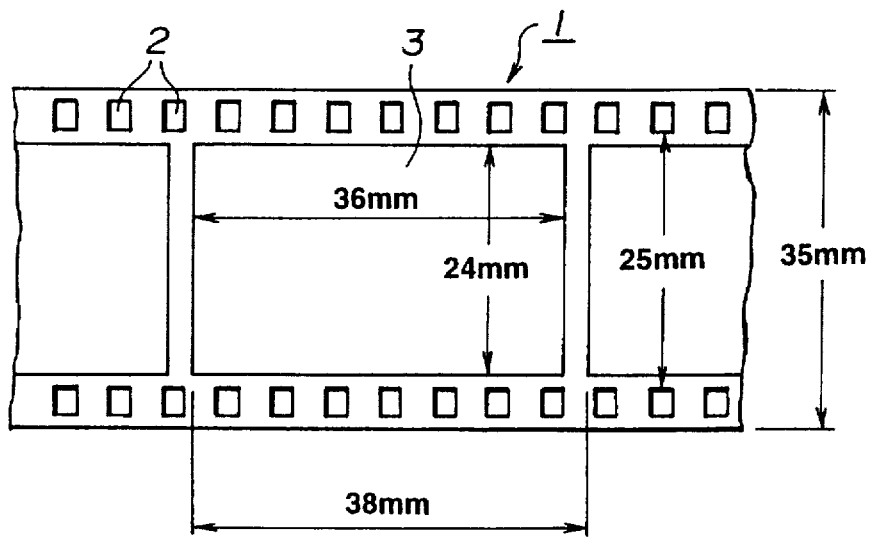
FIG. 1 shows a format for a 35 mm photographic film.

Referring to the drawings, preferred embodiments of the motion picture film recording and projecting devices according to the present invention will be explained in detail.

The recording device includes a film running system in which a motion picture film 100 is reeled out from a supply reel 11 and travels via a guide roll 12, driving rolls 1B, a film regulating plate 14, a tension roll 15 and another guide roll 16 until it is taken up by a take-up roll 17. A sound track writing block 20 is provided between the guide roll 12 and the driving roll 13 of the film running system, and a recording unit 30 and a frame-based film feed unit 40 are provided in the vicinity of the film regulating plate 14.

Figure 3:
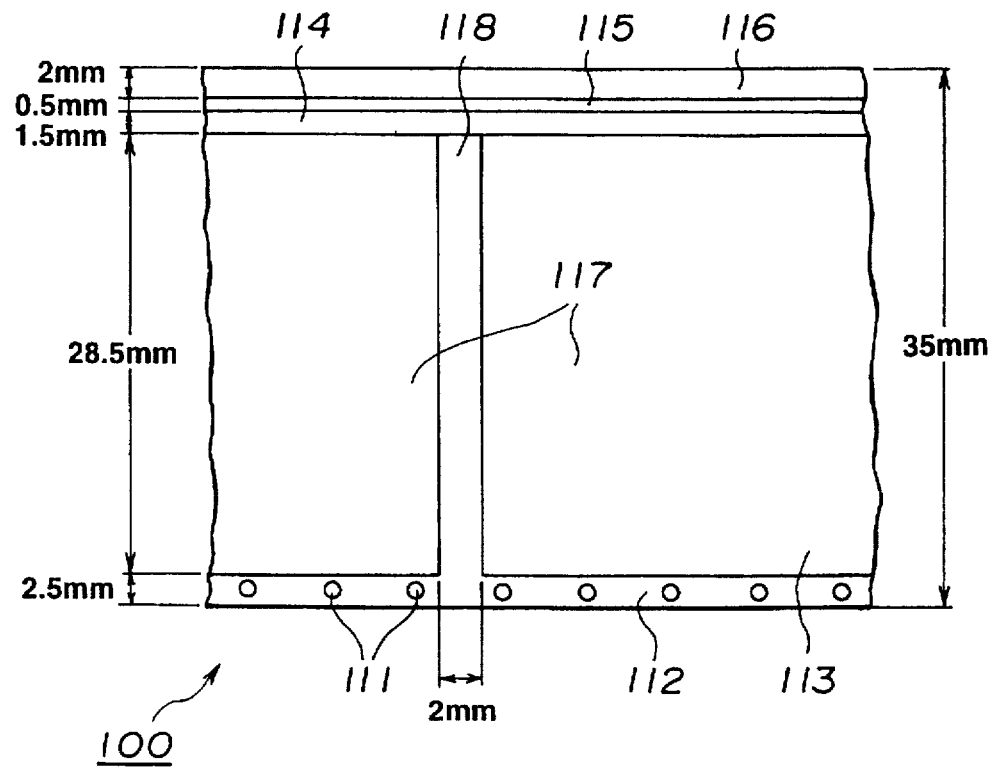
FIG. 3 shows a format for a motion picture film employed in the recording device shown in FIG. 2.

The motion picture film 100 employed in the present embodiment is a single side perforated 35 mm motion picture film having small circular openings 111 formed on one of its longitudinal sides at a pre-set interval from one another, as shown in FIG. 3. The film has a perforation area 112, 2.5 mm in width, an image area 113, 28.5 mm in width, a digital sound track area 114, 1.5 mm in width, a frame position information area 115, 0.5 mm in width and an analog sound track area 116, 2 mm in width. An inter-frame information area 118, 2 mm in width, is provided between adjacent frames 117 of the image area 113.

The driving rolls 13 are rotated at a pre-set speed, with the motion picture film 100 clamped therebetween, for reeling out the motion picture film from the supply roll 11 at a pre-set speed.

The sound track writing block 20, provided between the guide roll 12 and the driving rolls 13, optically records the audio information in the analog sound track area 116 of the motion picture film 100 reeled out by the driving rolls 13 at the pre-set speed from the supply reel.

Figure 4:
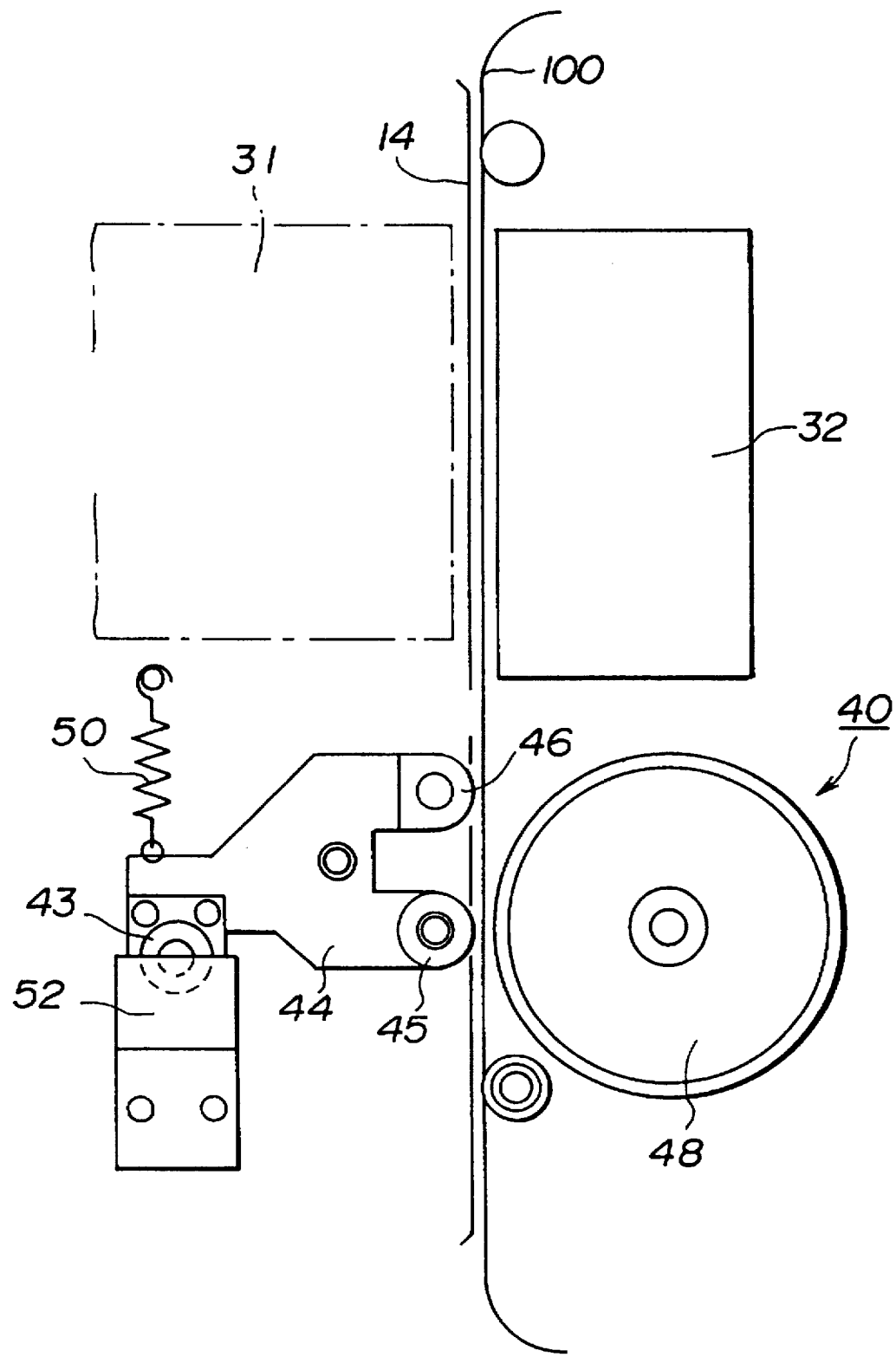
FIG. 4 is a plan view showing a frame feed section of the recording device shown in FIG. 2.

The recording unit 30 includes a recording optical system 31 and a subsidiary information recording system 35, provided on both sides of the motion picture film 100, as shown in FIG. 4. The subsidiary information recording system 35 includes a frame position and digital sound track information writing block an inter-frame information writing block 33 and a small opening readout block 34, as shown in FIG. 5.

The recording optical system 31 has enclosed therein a shutter mechanism, not shown, which is opened each time the film feed by the frame-based feed unit 40 is halted. Each time the film feed is halted, the recording optical system exposes the motion picture film 100 from its front side for sequentially recording each frame image. The frame position and digital sound track information writing block 32 and the inter-frame information writing block 33 include, for example, LCD masks and dot matrix LEDs, operatively linked to the shutter mechanism. The frame position and digital sound track information writing block 32 optically records the frame position information and the digital audio information in the frame position information area 115 and in the digital sound track area 114 of the motion picture film 100 from the rear side of the film each time the film feed is halted. The inter-frame information writing block 33 optically records the frame control information in the inter-frame information area 118 of the motion picture film 100 from the rear side of the film each time the film feed is halted. The small opening readout block 34 has a CCD linear sensor, for example, and reads out the small openings 111 provided in the perforation area 112 of the motion picture film 100 and transmits the read-out information as the control information to a control circuit 42.

Figure 5:
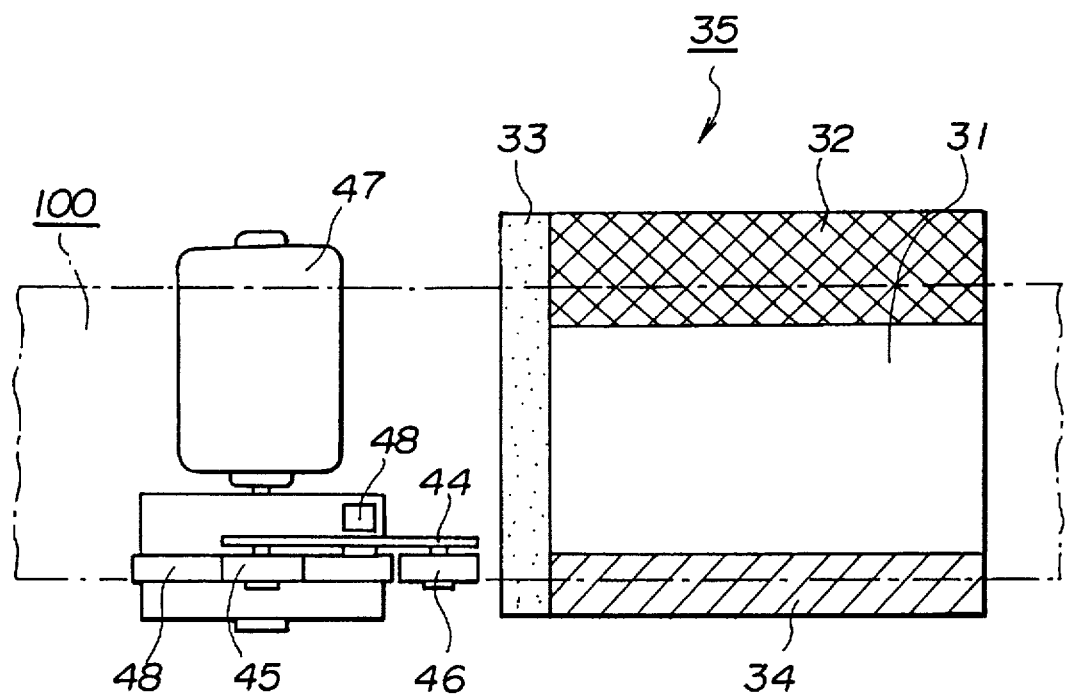
FIG. 5 is a front view showing an arrangement of the frame feed unit and a recording unit of the recording device shown in FIG. 2.

The frame-based film feed unit 40 includes a voice coil 43, intermittently driven by the control circuit 42 based upon a detection output of the small orifice readout block 34, a substantially Y-shaped oscillating member 44 oscillated by the voice coil 43, an idler 45 provided at the foremost part of a first arm of the oscillating member 44, a brake shoe 46 provided at the foremost part of a second arm of the oscillating member 44, and a rotary drum 48 run in rotation at a pre-set rpm by a drum motor 47 shown in FIG. 5.

The oscillating member 44 is pivotally mounted with a pivot shaft 49 as a center of rotation, and has the foremost part of its third arm biased by a tension coil spring 50 in a direction of spacing the idler 45 away from the rotary drum 48. The idler 45 is designed to be pressed onto the rotary drum 48, with the motion picture film 100 in-between, by the foremost part of the third arm thereof being driven by the voice coil 43 against the bias of the tension coil spring 50. That is, the idler 45 is adapted for being contacted and separated away from the rotary drum 48, with the motion picture film 100 in-between, by the oscillatory movement of the oscillating arm 44.

Figure 6:
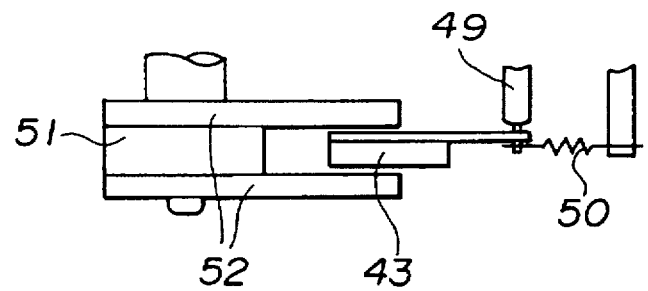
FIG. 6 is a side view showing the state of a voice coil mounted in the frame feed unit.

The voice coil 43 is arranged in a magnetic field produced by magnetic path plates 52 provided for clamping a permanent magnet 51 in-between, as shown in FIG. 6. When fed with the electric current, the voice coil drives the oscillating arm 44 against the bias of the tension coil spring 50.

The idler 45 and the rotary drum 48 play the role of friction wheels adapted to have a rolling contact with the motion picture film 100 with the motion picture film 100 clamped in-between. The idler 45 and the rotary drum 48 make up film feed means which effect film feed as the idler and the rotary drum clamp the motion picture film in-between and which halt film feed as the idler 45 is moved away from the rotary drum 48.

Figure 7:
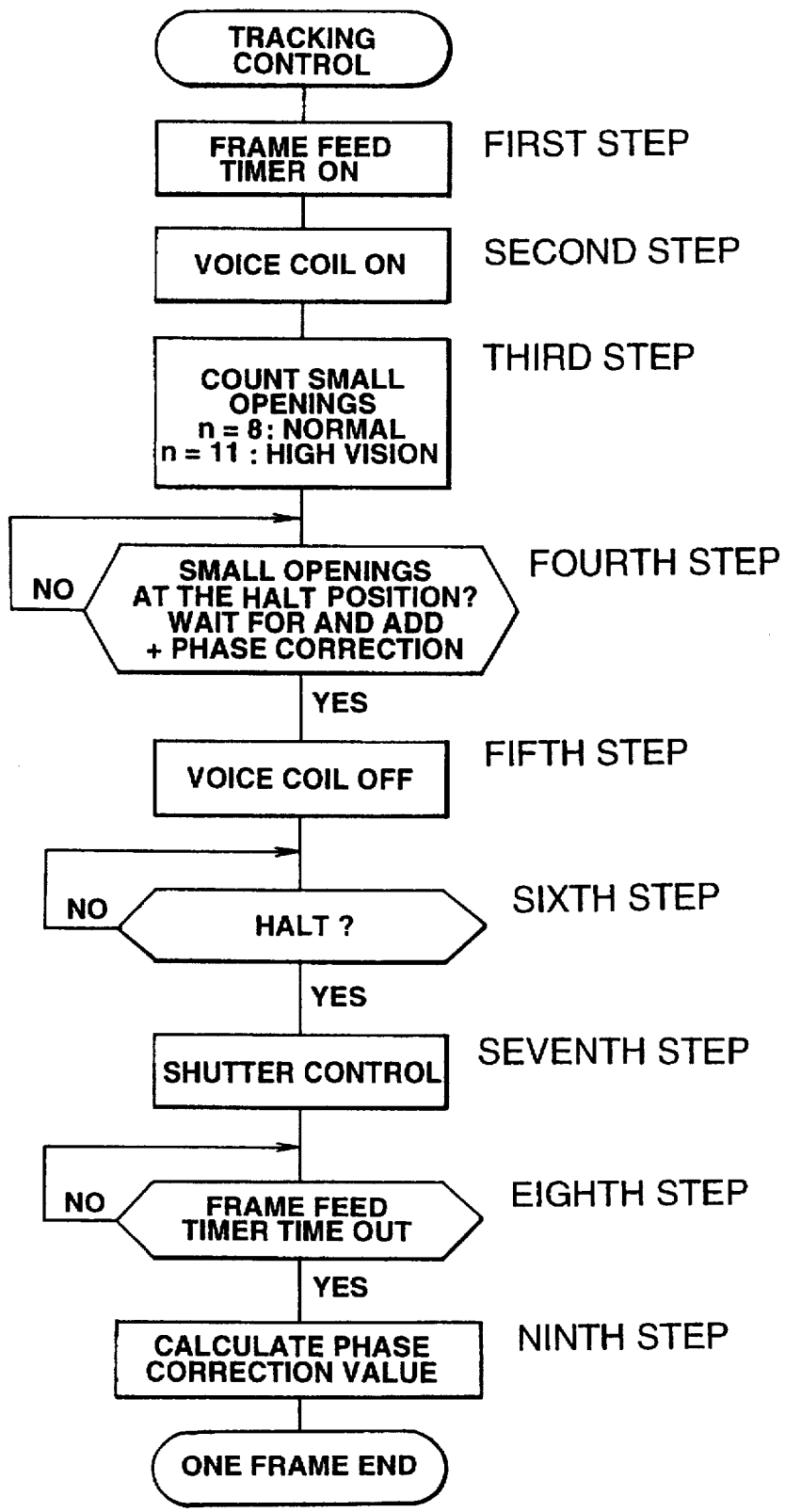
FIG. 7 is a flow chart for illustrating the motion picture film frame feed operation in the recording device shown in FIG. 2.

The control circuit 42 for the voice coil 43 causes the film feed means to effect intermittent feed (frame-based film feed) of the motion picture film 100 by controlled driving of the voice coil 43 in accordance with the procedure shown in the flow chart of FIG. 7.

Referring to the flow chart of FIG. 7, a frame-based film feed timer is turned on at a first step, and the voice coil 43 is driven at a second step. At this second step, the driving of the voice coil 43 causes the idler 44 to be pressed onto the rotary drum 48. This causes the motion picture film 100 to be transported by the film feed means made up of the idler 45 and the rotary drum 48.

At the next third step, the film feed quantity is detected by counting detection outputs by the small opening readout block 34. At s fourth step, it is checked whether or not the small openings 111 of the motion picture film 100 are at the halt positions. Stationary deviations in the stop positions may also be corrected at this time using phase correction values as later explained. If the small opening s 111 of the motion picture film 100 are at the stop positions, control proceeds to a fifth step in order to stop the driving of the voice coil 43. At this fifth step, by halting the driving of the voice coil 43, the idler 45 is moved away from the rotary drum 48. This halts the film feed by the film feed means made up of the idler 45 and the rotary drum 48.

With the idler 45 moved away from the rotary drum 48, a brake shoe 48 provided at the distal end of the second arm of the oscillating arm 44 is pressed for immobilizing the motion picture film 100.

At the next sixth step, it is checked whether or not film feed by the film feed means is halted. If the film feed by the film feed means is halted, control proceeds to a seventh step in order to effect shutter control, light exposure and recording on the halted motion picture film 100 by the recording unit 30.

At the eighth step, it is checked whether or not the frame-based film feed timer has timed out. If the timer has timed out, control proceeds to a ninth step in order to calculate small deviations of the small openings 111 from the correct stop positions as phase correction values. This terminates the film feed for one frame.

Thus the control circuit 42 stops the driving of the voice coil 43 only for a pre-set time interval each time the motion picture film 100 is fed a pre-set amount by the film feed means made up of the idler 45 and the rotary drum, 48. By the driving of the voice coil 43 halted in this manner, the idler 45 is moved away from the rotary drum 48 to halt the film feed by the film feed means. Thus, by intermittently driving the voice coil 43 for oscillating the oscillating arm 44, the film feed means effect intermittent feed (frame-based film feed) of the motion picture film 100.

In this manner, the small opening readout block 34 and the control circuit 42 play the role of feed control means for detecting the small openings 111 provided at equal intervals in the motion picture film 100 for reducing the force of friction of the film feed means at a pre-set interval.

The tension roll 15 is provided at the distal end of a tension arm 58 having its one end biased by a tension coil spring 55. The tension roll 15 is adapted to have a rolling contact with the motion picture film 100 under the bias of the tension coil spring 55 for maintaining a constant tension. The motion picture film 100 is taken up on the takeup reel 17 as the constant tape tension is maintained by the tension roll 15.

The rotary drum 48 has a drum diameter of, for example, 32 cm, and is rotated at an rpm of 3600 corresponding to the peripheral velocity of approximately 6 meters/second. The lag time of the voice coil 43 is 5 milliseconds or less and the shutter opening ratio is not less than 75% and not less than 60% for the normal size and for the high-vision size, respectively. The mean film feed rate is 42 mm×24 frames and 57.75 mm×30 frames for the high vision size, respectively.

With the above-described recording device, since the motion picture film 100 is fed on the frame basis under the force of friction by the film feed unit 40, and the images are recorded on the motion picture film 100 on the frame basis, recording may be made with an extremely small noise due to film feed as compared to the case in which film feed is made by the sprockets.

With the above-described recording device, the film feed quantity is detected by counting the detection outputs of the small opening readout block 34 and the voice coil 43 ceases to be driven at an interval of a pre-set film feed quantity, so that an image corresponding to one frame is recorded during the driving stop period. It is however possible to stop the driving of the voice coil 43 at a pre-set time interval and to record a one-frame image during such driving stop period. Also a pneumatic pressure may be utilized in place of the idler 45 for controlling the force of friction between the motion picture film and the rotary drum 48.

Figure 8:
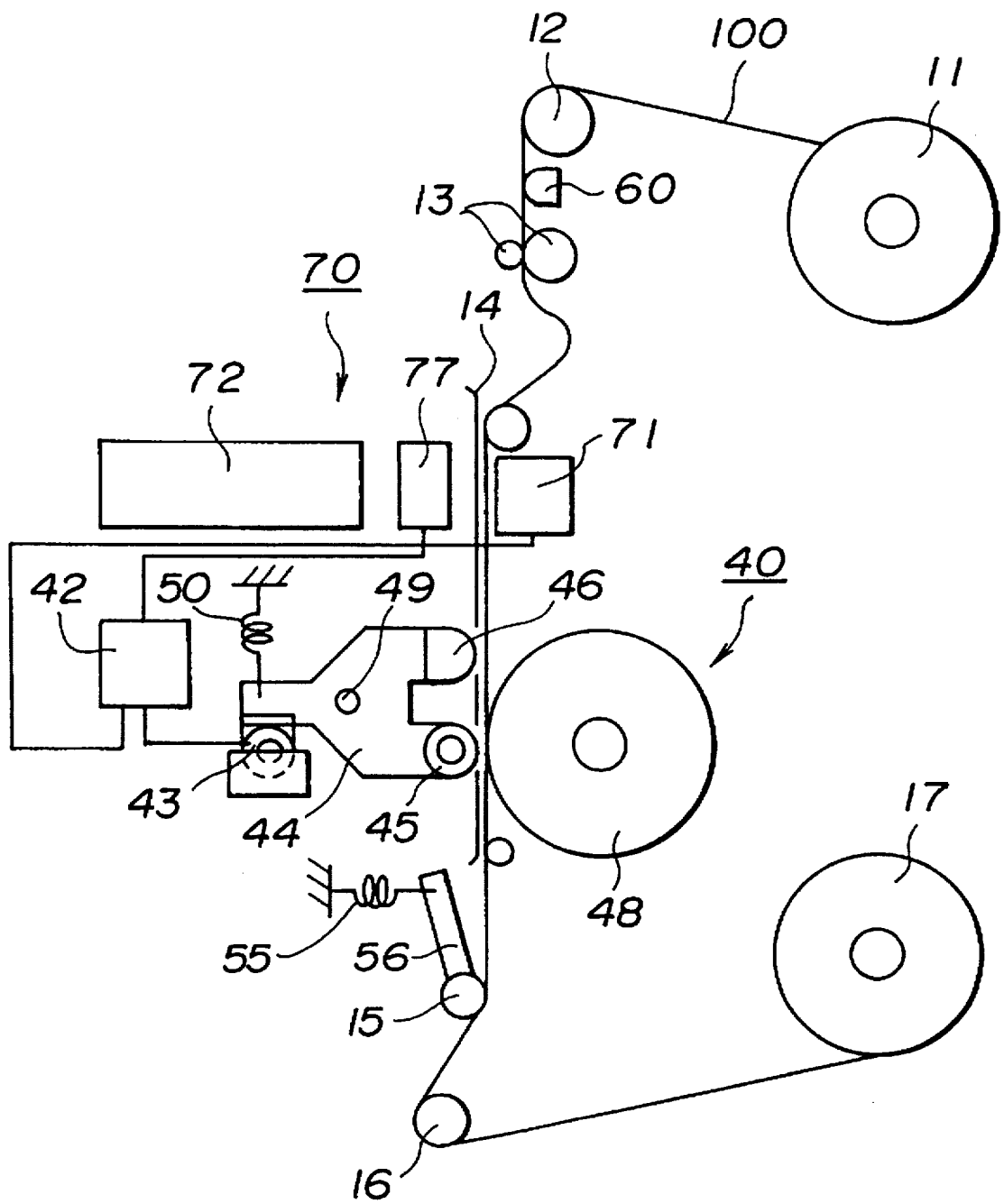
FIG. 8 shows an arrangement of a motion picture film projecting device according to the present invention.

The motion picture film projection device according to the present invention is arranged and constructed as shown for example in FIG. 8.

Figure 2:
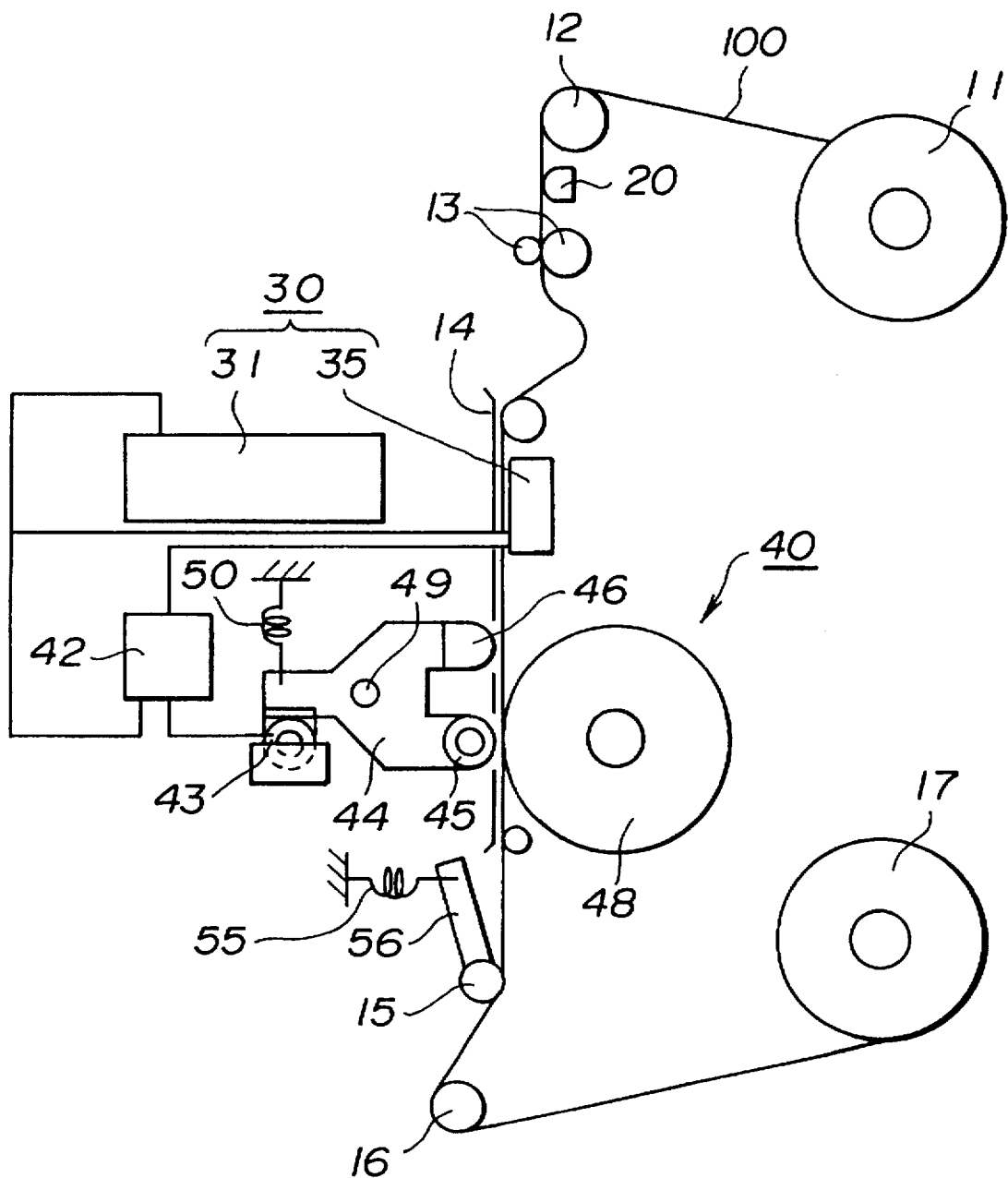
FIG. 2 shows an arrangement of a motion picture film recording device according to the present invention.

The projecting device projects frame-based images of the motion picture film 1 on which recording has been made by the recording device shown in FIG. 2. The projecting device includes a film running system similar in construction to that of the recording device. A sound track readout block 80 is provided between the guide roll 12 and the driving rolls 13 of the film running system, while a projecting unit 70 and a film feed unit 40 are provided in the vicinity of a film controlling plate 14. The parts or components similar to those of the recording device are indicated by the same numerals and the detailed description is not made herein.

The sound track readout block 60, provided between the guide roll 12 and the driving rolls 13, optically reads the audio information from the analog sound track area 116 of the motion picture film 100 reeled out by the driving roll 13 at a pre-set speed from the supply reel 1 and transmits the read-out information to an audio reproducing unit, not shown.

Figure 9:
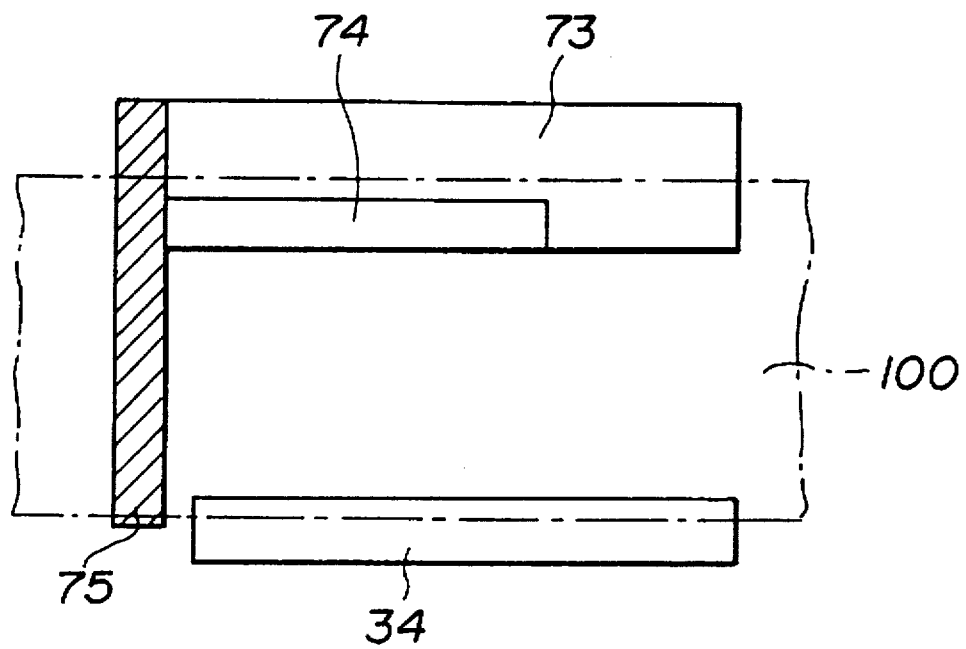
FIG. 9 is a front view showing information readout blocks of the motion picture film projecting device shown in FIG. 8.

The projecting unit 70 includes a light source 71 for radiating the projecting light to the motion picture film 100, a projection optical system 72 for projecting each frame image of the image area 113 of the motion picture film 100 on a screen, not shown, and a read-out block 77. The read-out block includes a number of information readout blocks, arranged along the outer periphery of the film 100, such as a frame position information readout block 73, a sound track information readout block 74, an inter-frame information readout block 75 and a small-opening readout block 34, as shown in FIG. 9.

Figure 10:
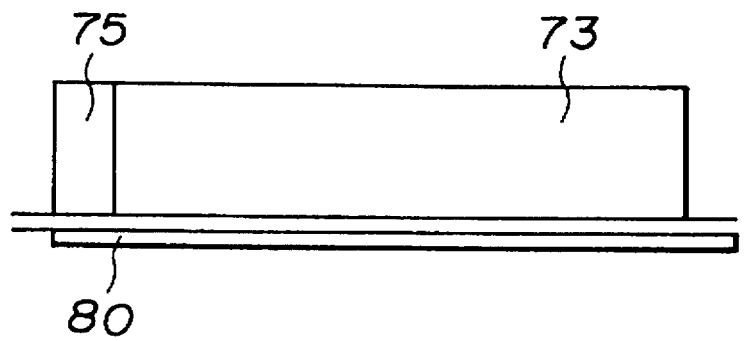
FIG. 10 is a plan view showing the information readout blocks of the motion picture film projecting device shown in FIG. 8.

The light source 71 includes a shutter mechanism, not shown, which is opened each time the film feed by the frame-based film feed unit 40 is halted, and radiates the projecting light on the motion picture film 100 each time the film feed is halted. The frame position information readout block 73, sound track information readout block 74, inter-frame information readout block 75 and the small-opening readout block 34 are irradiated with the projecting light from the light source 71 via a light attenuating filter 80, as shown in FIG. 10.

The projecting light system 72 projects the projecting light transmitted through the frames of the motion picture film 100 on a screen, not shown, for projecting the frame images.

The frame position information readout block 73 is constituted by, for example, a CCD linear sensor, which reads out the frame position information recorded in the frame position information area 115 of the motion picture film 100 each time the film feed is halted, and which outputs the read-out data to the control circuit 42. The sound track information readout block 74 is constituted by, for example, a 960×46 dot CCD area sensor, which optically reads out the audio information from the digital sound track area 114 of the motion picture film 100 each time the film feed is halted, and transmits the read-out data to an audio playback system, not shown. The inter-frame information read-out block 75 is constituted by, for example, a 624×68 dot CCD area sensor, which reads out the control information recorded in the inter-frame information area 118 of the motion picture film 100 each time the film feed is halted and transmits the read-out data to a control unit, not shown. The small-opening read-out block 34 reads out the small openings 111 provided in the perforated area 112 of the motion picture film 100 and transmits the read-out information to the control circuit 42 as the control information. The control circuit 42 effects film feed synchronized with the small openings 111 or control of the shutter mechanism, in the same manner as in the above-mentioned recording device. At this time, the control circuit 42 utilizes the above-mentioned frame position information as the subsidiary information in order to effect more accurate frame-based film feed and control of the shutter mechanism. It is also possible to effect frame-based film feed and shutter control using only the frame position information without employing the small openings 111.

With the above-described projection device, since the motion picture film 100 is fed on the frame basis by the frame-based film feed unit 40 under the force of friction, and the images of the respective frames of the motion picture film 100 are projected by the projection unit 70, the frame images may be projected under an extremely small noise state due to the film feed as compared to the case in which film feed is made by the sprockets.

With the present projection device, the control circuit 42 of the frame-based film feed unit 40 intermittently drives the voice coil 43 based upon a detection output of the small opening readout block 34, in order to effect intermittent feed (frame-based film feed) of the motion picture film 100 by film feed means made up of the idler 45 and the rotary drum 48. However, the driving of the voice coil 43 may be discontinued at an interval of a pre-set time so that a frame image will be projected during such driving stop period. Also the force of friction between the motion picture film 100 and the rotary drum 48 may be controlled by the pneumatic pressure instead of by the idler 45.

What is claimed is:

1. A recording device for a motion picture film comprising:

film feed means for transferring a motion picture film by a frictional force, said film feed means including a first friction wheel rotated at a pre-set speed and a second friction wheel which can be moved into and out of contact with said first friction wheel by means of a voice coil wherein film feed occurs as the motion picture film is clamped between said first and second friction wheels and film feed is halted as said second friction wheel is moved away from said first friction wheel by means of said voice coil, feed control means for intermittently controlling the frictional force of said film feed means by stopping driving of said voice coil only for a pre-set time interval each time the motion picture film is fed a pre-set amount by said film feed means, and recording means for recording a frame picture of said motion picture film each time film fed by said film feed means is interrupted.

2. The recording device as claimed in claim 1 wherein said feed control means includes means for detecting small openings provided at an equal pitch in said motion picture film for reducing the frictional force of said film feed means at said pre-set interval.

3. The recording device as claimed in claim 1 wherein said feed control means includes means for reducing the frictional force of said film feed means at said pre-set time interval.

4. A projecting device for a motion picture film comprising:

film feed means for transferring a motion picture film by a frictional force, said film feed means including a first friction wheel rotated at a pre-set speed and a second friction wheel which can be moved into and out of contact with said first friction wheel by means of a voice coil wherein film feed occurs as the motion picture film is clamped between said first and second friction wheels and film feed is halted as said second friction wheel is moved away from said first friction wheel by means of said voice coil, feed control means for intermittently controlling the frictional force of said film feed means by stopping driving of said voice coil only for a pre-set time interval each time the motion picture film is fed a pre-set amount by said film feed means, and projecting means for projecting a frame picture of said motion picture film each time film fed by said film feed means is interrupted.

5. The projecting device as claimed in claim 4 wherein said feed control means includes means for detecting small openings provided at an equal pitch in said motion picture film for reducing the frictional force of said film feed means at said pre-set interval.

6. The projecting device as claimed in claim 4 wherein said feed control means includes means for reducing the frictional force of said film feed means at said pre-set time interval.

* * * * *